United States Patent [19]

Oshima et al.

[11] Patent Number: 5,020,310
[45] Date of Patent: Jun. 4, 1991

[54] LAWN MOWER

[75] Inventors: Hiroshi Oshima; Hideo Okura, both of Osaka, Japan

[73] Assignee: Kubota Corp., Osaka, Japan

[21] Appl. No.: 513,305

[22] Filed: Apr. 20, 1990

[30] Foreign Application Priority Data

Aug. 30, 1989 [JP] Japan .................................. 1-223818

[51] Int. Cl.⁵ ............................................ A01D 34/74
[52] U.S. Cl. ...................................... 56/17.2; 56/320.1
[58] Field of Search ...................... 56/17.1, 17.2, 17.5, 56/320.1, DIG. 17

[56] References Cited

U.S. PATENT DOCUMENTS 4,325,211  4/1982  Witt et al. ............................. 56/15.8
4,840,020  6/1989  Oka ................................... 56/17.2 X Primary Examiner—William P. Neuder
Attorney, Agent, or Firm—Jordan & Hamburg

[57] ABSTRACT

A lawn mower comprising a vehicle body including a first connecting frame in a forward portion thereof, and a vertically adjustable grass cutting unit including a second connecting frame for pin connection to the first connecting frame. The first connecting frame defines two pin-receiving bores arranged horizontally, one of which is a circular fitting bore and the other a slot providing play. The second connecting frame defines three pairs of pin-receiving bores, the respective pairs being disposed at different heights from the ground. The slot in the first connecting frame has a sufficient length to be connected to one of the top or bottom bores of the second frame while the circular bore is connected to the diagonally opposite bore of the second frame.

7 Claims, 2 Drawing Sheets

LAWN MOWER

TECHNICAL FIELD

The present invention relates to a lawn mower including a grass cutting unit vertically adjustably connected to a forward portion thereof.

BACKGROUND OF THE INVENTION

A known lawn mower of the type noted above comprises a vehicle body including an engine, a transmission case, running wheels, and a steering handle, and a grass cutting unit mounted on a forward portion of the vehicle body. The vehicle body and cutting unit have respective frames interconnected through a pair of longitudinally arranged connecting bolts. The frame of the cutting unit defines plural pairs of connecting bores, so that the height of the cutting unit is adjustable by selecting one of the pairs of connecting bores.

When adjusting the height of the cutting unit in the above structured walking-operator type lawn mower, the cutting unit is completely detached by removing the pair of connecting bolts and then lifted in a horizontal posture by means of a jack to attach the connecting bolts to a different bore pair. This requires a difficult operation for positioning the connecting bores while lifting the heavy cutting unit in a horizontal posture. Consequently, vertical adjustment of the cutting unit is a troublesome and time-consuming task.

In order to solve the above noted problem, the cutting unit may be made vertically adjustable by means of vertically elongated slots defined in the frame of the cutting unit. However, such a structure would have a practical drawback in that the connecting bolts may be loosened such as by vibrations of the vehicle body, whereby the mounting position of the cutting unit tends to be vertically displaced.

SUMMARY OF THE INVENTION

An object of the present invention is to provide an improved lawn mower having a grass cutting unit positionally adjustable by means of a plurality of connecting bores, which comprises a vehicle body including a first connecting frame in a forward portion thereof, an engine and a transmission case mounted on the vehicle body, and a grass cutting unit mounted on the forward portion of the vehicle body and including a second connecting frame connected to the first connecting frame of the vehicle body, whereby a mounting and adjusting operation can be readily carried out without utilizing a jack or the like.

In order to achieve the foregoing object, a lawn mower according to the present invention further comprises first connecting bore means including a pair of bores defined in one of the first connecting frame and second connecting frame, second connecting bore means including plural pairs of bores defined in the other of the first connecting frame and second connecting frame, the respective pairs being disposed at different heights from the ground, and connecting means insertible through the bores of the first and second connecting bore means to connect the grass cutting unit to the vehicle body, wherein one of the bores in the first connecting bore means is shaped to fit with the connecting means, and the other of the bores is defined as a slot having play relative to the connecting means.

With the present invention, what is required in adjusting the height of the grass cutting unit is to remove the connecting means from the slot and to pivot the vehicle body about the connecting means, e.g. connecting pin, in the fitting bore. When a desired connecting bore is brought into register with the slot, a connecting pin is inserted into the bore and slot, and then the connecting pin in the fitting bore is removed to enable the vehicle body to pivot about the connecting pin in the slot. Similarly, the connecting pin is inserted into the bores when the positional relationship between the desired bores is obtained.

Thus, since the connecting bore corresponding to one of the connecting pins is defined as a slot to allow the vehicle body to pivot about the other of the connecting pins, the mounting position of the mower can be changed without utilizing a jack or the like thereby facilitating height adjustment of the grass cutting unit.

Adjusted stepwise through a plurality of connecting bores, the mounting position of the cutting unit is not vertically displaced due to vibrations of the body, which assures safe use of the grass cutting unit.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENT

Figure 1:
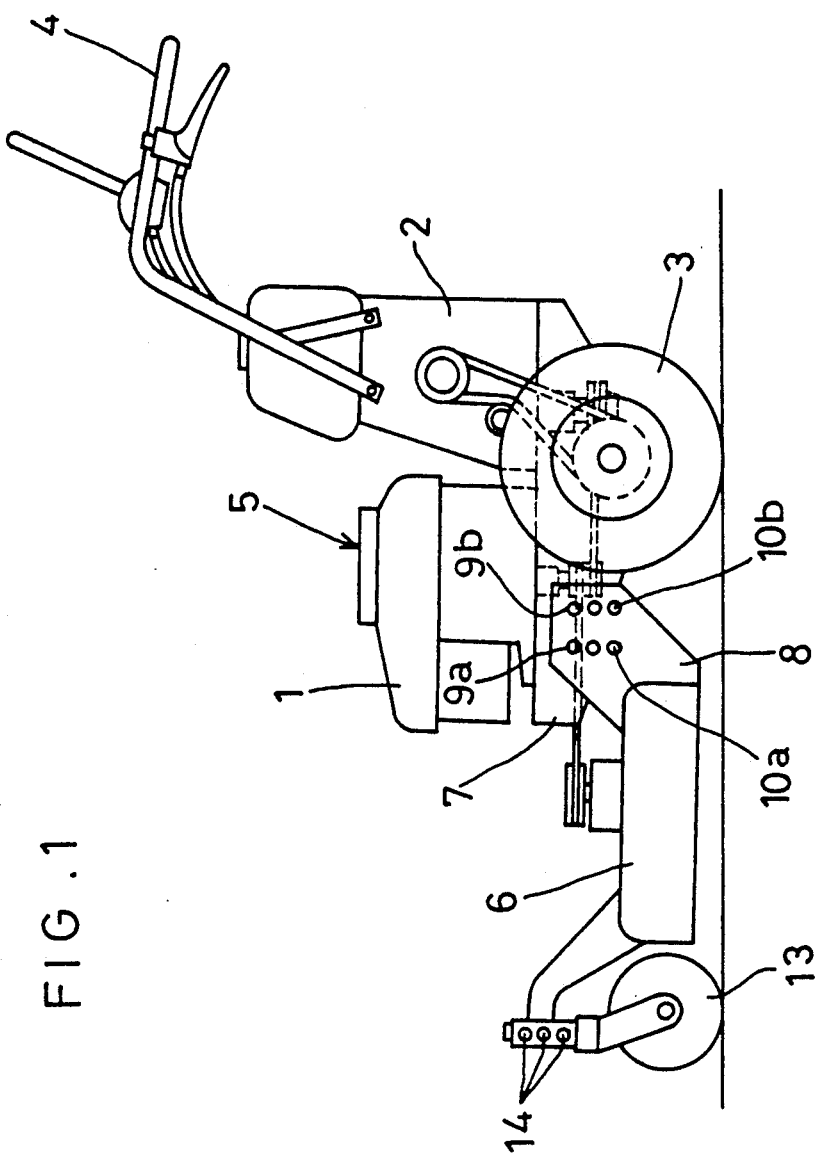
FIG. 1 is a side elevation of a walking-operator type lawn mower embodying the present invention.

FIG. 1 shows a walking-operator type lawn mower as an embodiment according to the present invention. The lawn mower comprises an engine 1, a transmission case 2, running wheels 3 and a steering handle 4 which are included in a vehicle body 5, with a grass cutting unit 6 directly connected to a forward portion of the vehicle body 5.

As shown in FIG. 1A, the cutting unit 6 includes a frame 8 connected to a frame 7 of the vehicle body 5 through a pair of longitudinally arranged connecting pins 9a and 9b acting as connecting members. The frame 8 of the cutting unit 6 vertically defines three pairs of longitudinally arranged connecting bores 10a and 10b corresponding to the connecting pins 9a and 9b. The height of the cutting unit 6 is adjustable in three steps by selecting one of the three pairs of connecting bores 10a and 10b.

Figure 2A:
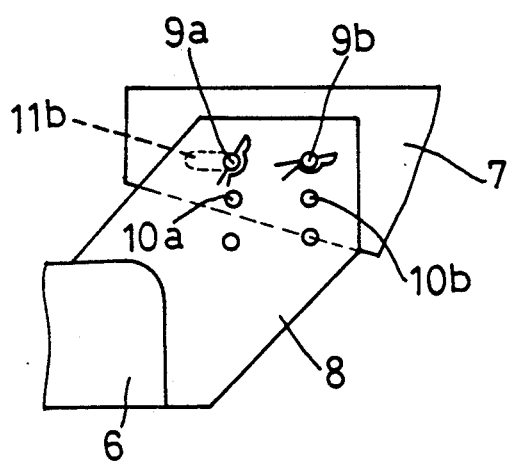
FIGS. 2A, 2B and 2C are side views showing connecting portions in a position adjusting operation of a cutting unit, respectively.
Figure 2C:
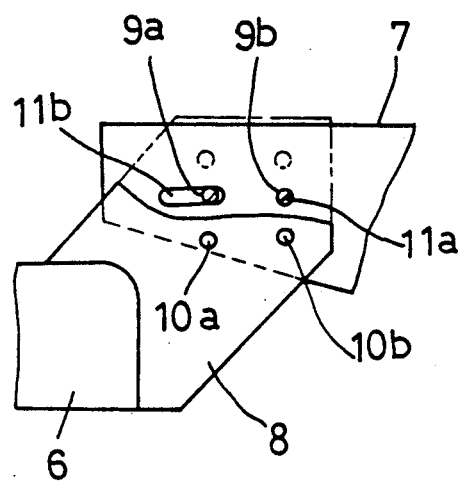
Figure 2B:
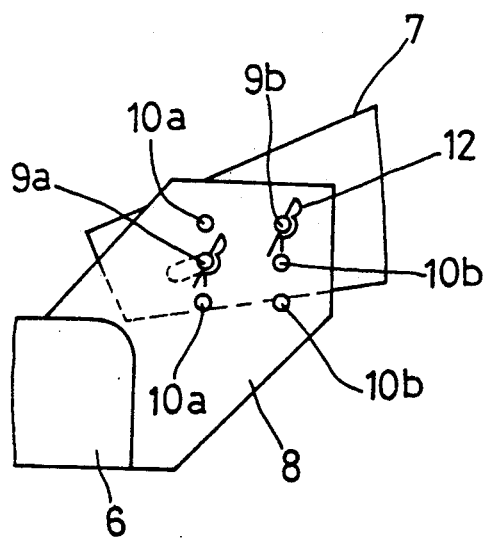

The frame 7 of the vehicle body defines a pair of longitudinally arranged connecting bores 11a and 11b. The rearward bore 11a is a circular bore in which the corresponding connecting pin fits tight, while the forward bore 11b is a slot. As shown in FIGS. 2A, 2B and 2C, the vehicle body is pivoted about the rearward connecting pin 9b to vary the position of the forward connecting bore 11b for receiving the connecting pin 9a. The slot 11b has a sufficient length to receive the connecting pin 9a in the lowermost forward connecting bore 10a when the connecting pin 9b is received in the uppermost rearward connecting bore 10b.

The connecting pins 9a and 9b are insertible into and removable from the connecting bores 11a and 11b of the vehicle body and the connecting bores 10a and 10b of the cutting unit, and include beta-shaped pins 12 inserted into forward ends thereof to avoid inadvertent removal of the connecting pins from the frames 7 and 8.

The cutting unit 8 includes caster wheels 13 mounted pivotably about vertical axes on a forward end thereof. The caster wheels 13 are vertically adjustable through a plurality of pin connecting bores 14 vertically arranged with the same pitch as the connecting bores 10a and 10b.

Bolts may be utilized as the connecting members instead of the connecting pins 9a and 9b described above.

Figure 3:
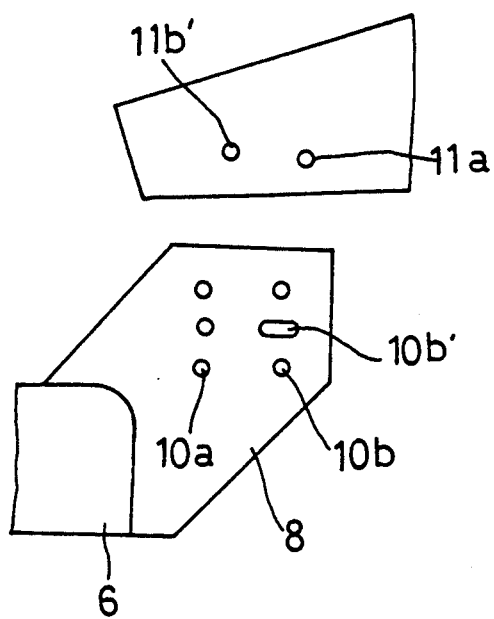
FIG. 3 is a side view showing connecting bores defined in the body and the mower according to another embodiment of the present invention.

Further, apart from the foregoing embodiment, the frame 8 of the cutting unit 6 may define one of the bores in the vertically middle pair as a slot 10b'. In this case, the frame 7 for the vehicle body defines two connecting bores which are both circular fitting bores 11a and 11b' as shown in FIG. 3.

It will be appreciated that the present invention can also be applied to a variety of working machines other than the lawn mower including a floor cleaning apparatus.

What is claimed is:

1. A lawn mower comprising;
a vehicle body including a first connecting frame in a forward portion thereof,
an engine and a transmission case mounted on the vehicle body,
a grass cutting unit mounted on the forward portion of the vehicle body and including a second connecting frame connected to the first connecting frame of the vehicle body,
first connecting bore means including a pair of bores defined in one of the first connecting frame and second connecting frame,
second connecting bore means including plural pairs of bores defined in the other of the first connecting frame and second connecting frame, the respective pairs being disposed at different heights from the ground, and
connecting means insertible through the bores of the first and second connecting bore means to connect the grass cutting unit to the vehicle body,
wherein one of the bores in the first connecting bore means is shaped to fit with the connecting means, and the other of the bores is defined as a slot having play relative to the connecting means.

2. A lawn mower as claimed in claim 1 wherein the first connecting bore means is defined in the first connecting frame and the second connecting bore means is defined in the second connecting frame.

3. A lawn mower as claimed in claim 1 wherein the first connecting bore means is defined in the second connecting frame and the second connecting bore means is defined in the first connecting frame.

4. A lawn mower as claimed in claim 2 wherein the second connecting bore means includes three pairs of fitting bores arranged side by side, the three pairs having different heights from the ground, thereby allowing the grass cutting unit to be selectively adjusted to three different heights from the ground.

5. A lawn mower comprising;
a vehicle body including a first connecting frame in a forward portion thereof,
an engine and a transmission case mounted on the vehicle body,
a grass cutting unit mounted on the forward portion of the vehicle body and including a second connecting frame connected to the first connecting frame of the vehicle body,
first connecting bore means including two bores arranged horizontally in the first connecting frame,
second connecting bore means including three pairs of bores defined in the second connecting frame, each pair having two horizontally arranged bores and located at a different height to the other pairs from the ground, and
a pair of connecting pins insertible through the bores of the first bore means and one of the pairs of bores in the second connecting bore means to connect the grass cutting unit to the vehicle body,
wherein one of the pair of bores in the first connecting bore means is shaped to fit with the connecting pin, the other of the bores is defined as a slot having play relative to the connecting pin, and the three pairs of bores of the second connecting bore means are shaped to fit with the connecting pins.

6. A lawn mower comprising;
a vehicle body including a first connecting frame in a forward portion thereof,
an engine and a transmission case mounted on the vehicle body,
a grass cutting unit mounted on the forward portion of the body and including a second connecting frame connected to the first connecting frame of the vehicle body,
first connecting bore means including two bores horizontally arranged in the first connecting frame,
second connecting bore means including three pairs of bores defined in the second connecting frame, each pair having two horizontally arranged bores and located at a different height to the other pairs from the ground, and
a pair of connecting pins insertible through the bores of the first bore means and one of the pair of bores in the second connecting bore means to connect the grass cutting unit to the vehicle body,
wherein the pair of the bores in the first connecting bore means are shaped to fit with the connecting pins, and one of the bores in a vertically intermediate pair in the second connecting bore means is defined as a slot having play relative to the connecting pin.

7. A working vehicle comprising;
a vehicle body including first connecting plate means in a forward portion thereof,
an engine and a transmission case mounted on the vehicle body,
a working implement mounted on the forward portion of the vehicle body and including second connecting plate means connected to the first connecting plate means,
first connecting bore means including a pair of bores defined in one of the first connecting plate means and second connecting plate means,
second connecting bore means including plural pairs of bores defined in the other of the first connecting plate means and second connecting plate means, the respective pairs of bores being located at a different height to the other pairs from the ground, and
connecting means insertible through the bores of the first and second connecting bore means to connect the working implement to the vehicle body,
wherein one of the bores in the first connecting bore means is shaped to fit with the connecting means, and the other of the bores is defined as a slot having play relative to the connecting means.

* * * * *